United States Patent
Cammack

(10) Patent No.: US 6,653,799 B2
(45) Date of Patent: Nov. 25, 2003

(54) SYSTEM AND METHOD FOR EMPLOYING PULSE WIDTH MODULATION WITH A BRIDGE FREQUENCY SWEEP TO IMPLEMENT COLOR MIXING LAMP DRIVE SCHEME

(75) Inventor: David A. Cammack, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/918,093

(22) Filed: Jul. 30, 2001

(65) Prior Publication Data

US 2002/0041165 A1 Apr. 11, 2002

Related U.S. Application Data

(63) Continuation-in-part of application No. 09/684,196, filed on Oct. 6, 2000.

(51) Int. Cl.[7] .............................................. H05B 37/02
(52) U.S. Cl. ...................................... 315/224; 315/291
(58) Field of Search ................................ 315/291, 307, 315/224, 246, 247, 209 R, 225, DIG. 7

(56) References Cited

U.S. PATENT DOCUMENTS

| 4,373,146 A | * | 2/1983 | Bonazoli et al. ............ 315/224 |
| 5,270,620 A | | 12/1993 | Basch et al. ................ 315/291 |
| 5,306,987 A | * | 4/1994 | Dakin et al. ................ 315/248 |
| 5,365,151 A | | 11/1994 | Spiegel et al. .............. 315/209 |
| 5,508,592 A | * | 4/1996 | Lapatovich et al. ..... 315/209 R |
| 5,623,187 A | * | 4/1997 | Caldeira et al. ............. 315/307 |
| 5,684,367 A | | 11/1997 | Moskowitz et al. ......... 315/246 |
| 6,005,356 A | * | 12/1999 | Horiuchi et al. ............. 315/246 |
| 6,184,633 B1 | | 2/2001 | Kramer ...................... 315/246 |

FOREIGN PATENT DOCUMENTS

| EP | 0785702 A2 | 7/1997 | ........... H05B/41/29 |
| EP | 0837620 A2 | 4/1998 | ........... H05B/41/29 |
| WO | WO9908492 | 2/1999 | ........ H05B/41/392 |

* cited by examiner

Primary Examiner—Don Wong
Assistant Examiner—Ephrem Alemu

(57) ABSTRACT

A gas discharge lamp is driven by a bridge circuit which produces a pulse voltage signal. The bridge circuit is pulse width modulated at an operational frequency, and has a power input for receiving power from a power source, and a control signal input for receiving a control signal that effects sweeping of the operational frequency and generation of the pulse voltage signal. The system further includes a controller for controlling the bridge circuit, the controller comprising circuitry for (i) generating a signal comprising a frequency swept signal that is amplitude modulated by a fixed frequency signal, the highest frequency of the frequency swept signal being lower than the operational frequency, and the signal generated by the controller being inputted into the control signal input of the bridge circuit, and (ii) periodically sweeping the operational frequency of the bridge circuit. The system further includes a filter circuit for filtering the pulse voltage signal.

20 Claims, 17 Drawing Sheets

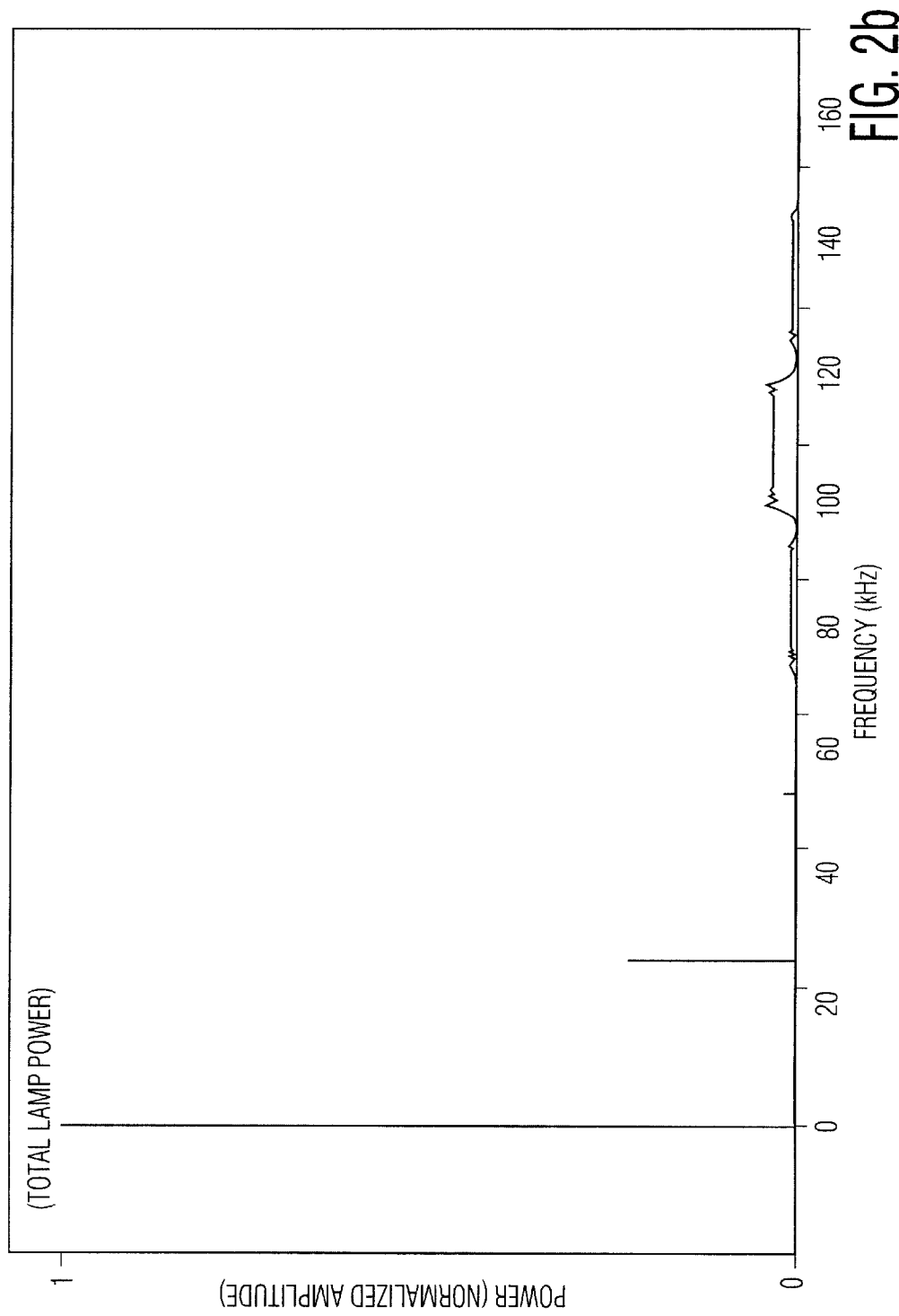

SYSTEM AND METHOD FOR EMPLOYING PULSE WIDTH MODULATION WITH A BRIDGE FREQUENCY SWEEP TO IMPLEMENT COLOR MIXING LAMP DRIVE SCHEME

CROSS REFERENCE TO RELATED APPLICATIONS

This is a continuation-in-part of U.S. application Ser. No. 09/684,196, filed Oct. 6, 2000, which is herein incorporated by reference.

BACKGROUND OF THE INVENTION

1. Field of the Invention

This invention relates to a system for driving a gas discharge lamp and more specifically to a system employing pulse width modulation for reducing color segregation in high intensity gas discharge lamps.

2. Description of Related Art

High intensity discharge lamps (HID) are becoming increasingly popular because of their many advantages, such as efficiency and light intensity. These HID lamps are driven by either a high frequency electronic ballast that is configured to generate driving current signals at above 20 KHz range or by a low frequency electronic ballast with driving current signals in the 100 Hz range.

A major obstacle to the use of high frequency electronic ballasts for HID lamps, however, is the acoustic resonances/arc instabilities which can occur at high frequency operation. Acoustic resonances, at many instances, can cause flicker of the arc which is very annoying to humans. Furthermore, acoustic resonance can cause the discharge arc to extinguish, or even worse, stay permanently deflected against and damage the wall of the discharge lamp.

Recently, a new class of high intensity discharge lamps has been developed that employ ceramic (polycrystalline alumina) envelopes. The discharge envelope in this class of lamps is cylindrical in shape, and the aspect ratio, i.e., the inner length divided by the inner diameter is close to one, or in some instances more than one. Such lamps have the desirable property of higher efficacy, but they have the disadvantage of having different color properties in vertical and horizontal operation. In particular, in vertical operation color segregation occurs.

The color segregation can be observed by projecting an image of the arc onto a screen, which shows that the bottom part of the arc appears pink, while the top part appears blue or green. This is caused by the absence of complete mixing of the metal additives in the discharge. In the upper part of the discharge there is excessive thallium emission and insufficient sodium emission. This phenomena leads to high color temperature and decreased efficacy.

U.S. Pat. No. 6,184,633 entitled Reduction of Vertical Segregation In a Discharge Lamp, incorporated herein by reference, teaches a method to eliminate or substantially reduce acoustic resonance and color segregation, by providing a current signal frequency sweep within a sweep time, in combination with an amplitude modulated signal having a frequency referred to as second longitudinal mode frequency. The typical parameters for such operation are a current frequency sweep from 45 to 55 kHz within a sweep time of 10 milliseconds, a constant amplitude modulation frequency of 24.5 KHz and a modulation index of 0.24. The modulation index is defined as $(V_{max}-V_{min})/(V_{max}+V_{min})$, where $V_{max}$ is the maximum peak to peak voltage of the amplitude modulated envelope and $V_{min}$ is the minimum peak to peak voltage of the amplitude modulated envelope. The frequency range of 45 kHz to 55 kHz is between the first azimuthal acoustic resonance mode and the first radial acoustic resonance mode. The second longitudinal mode can be derived mathematically, where the power frequency of the $n^{th}$ longitudinal mode is equal to $n*C_1/2L$ where "n" is the mode number, "$C_1$" is the average speed of sound in the axial plane of the lamp and "L" is the inner length of the lamp.

What is needed is an electronic ballast that can provide power to high intensity discharge lamps that (i) substantially reduces color segregation, (ii) substantially reduces acoustic resonances/arc instabilities, (iii) can be used with either horizontally or vertically oriented high intensity discharge lamps, and (iv) can be implemented at relatively low cost.

SUMMARY OF THE INVENTION

In one aspect, the present invention is directed to a ballast system for driving a gas discharge lamp. In one embodiment, the ballast system comprises a ballast bridge circuit for generating a pulse voltage signal. The bridge circuit has an operational frequency, a power input for receiving power from a power source, and a control signal input for receiving a signal that effects sweeping of the operational frequency and generation of the pulse voltage signal. The system further comprises a controller for generating the control signal so as to control the bridge circuit. The controller comprises circuitry that generates a signal comprising a frequency swept signal that is amplitude modulated by a fixed frequency signal. This signal is inputted into the control signal input of the bridge circuit. The controller further comprises circuitry for periodically sweeping the operational frequency of the bridge circuit. The system also includes a filter circuit for filtering the pulse voltage signal. In one embodiment, the sweep of the operational frequency of the bridge circuit is a non-linear sweep.

In one embodiment, the filter is configured to reproduce the desired power frequency components below about 150 kHz and maintain the components of the power frequencies above about 150 kHz at least 7.8 dB below the amplitude of the component at 150 kHz. In another embodiment, the filter is configured to reproduce the desired power frequency components below about 150 kHz and maintain the components of the power frequencies above about 150 kHz at least 10.8 dB below the amplitude of the component at 150 kHz.

In another aspect, the present invention is directed to a method for driving a gas discharge lamp, comprising the steps of providing a ballast system having a bridge circuit for generating a pulse voltage signal wherein the bridge circuit has an operational frequency, a power input for connection to a power source, and a control signal input for receiving a signal that effects sweeping of the operational frequency and generation of the pulse voltage signal, generating a signal comprising a frequency swept signal that is amplitude modulated by a fixed frequency signal and inputting the generated signal into the control signal input of the bridge circuit, periodically sweeping the operational frequency of the bridge circuit, and filtering the pulse voltage signal generated by the bridge circuit.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may be best understood by reference to the following detailed description when read with the accompanying drawings in which:

FIGS. 2a, 2b and 2c illustrate the frequency spectrum for an amplitude modulated signal provided by the ballast system of FIG. 1;

DETAILED DESCRIPTION OF THE INVENTION

Figure 1:
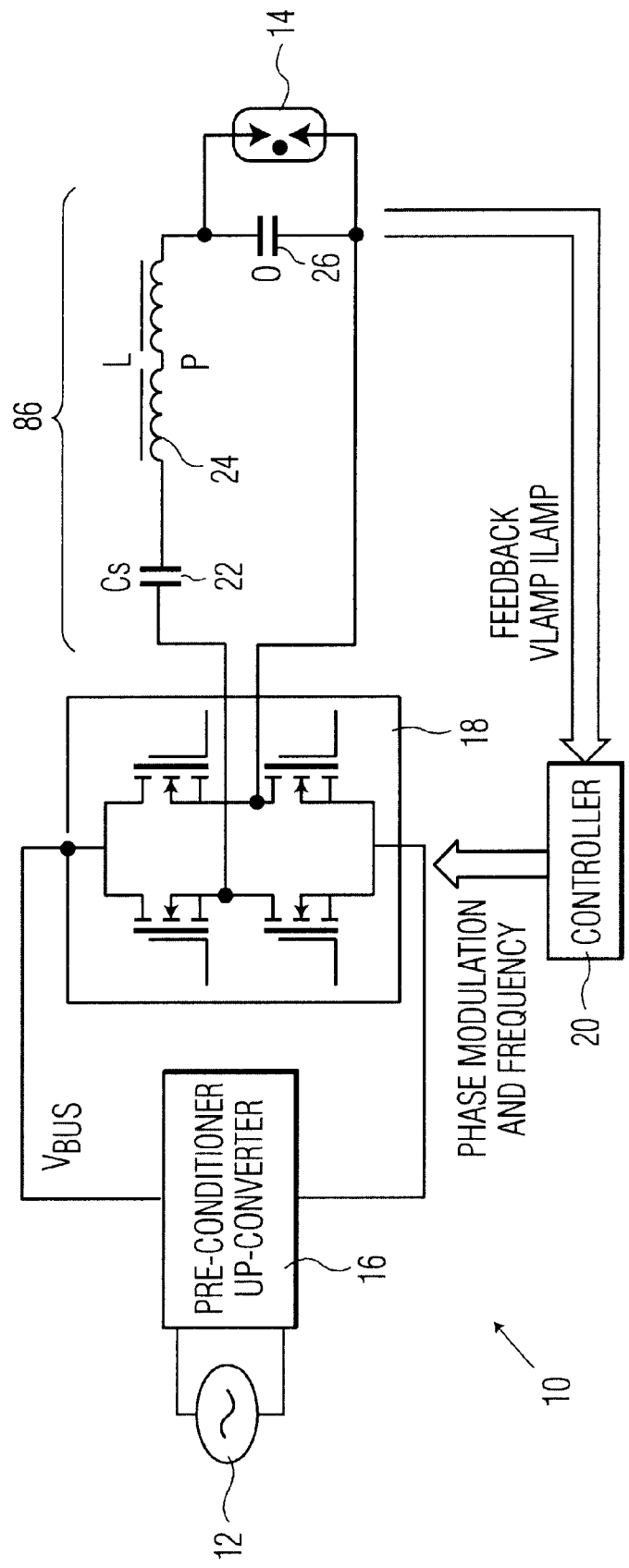
FIG. 1 is a diagram of an electronic ballast circuit in accordance with one embodiment of the present invention.

FIG. 1 illustrates an electronic ballast circuit 10 in accordance with one embodiment of the invention. Mains power supply 12 provides an AC current signal to a high and low voltage supply bus, $V_{BUS}$ that is ultimately employed to drive lamp 14. Ballast circuit 10 includes a pre-conditioner and up converter 16, which is configured to receive a rectified version of the mains power supply signal and shape the ballast supply current, also referred to as mains current, for power factor correction. Advantageously pre-conditioner and up-converter 16 includes a boost converter (not shown), whose operation is well known in the art.

A ballast bridge unit 18 is configured to receive the signal provided by pre-conditioner, and up-converter unit 16. Ballast bridge unit 18 functions as commutator that alternates the polarity of voltage signal provided to lamp 14 via filter circuit 86. Ballast bridge unit 18 comprises four MOSFET transistors that are switched to provide alternating signal paths for the signal carried in the power voltage signal buses $V_{BUS}$.

Ballast bridge unit 18 is controlled by a controller 20, that provides corresponding signals to the gates of the MOSFETS in the ballast bridge unit. The output port of the ballast bridge unit is coupled to a high intensity discharge (HID) lamp 14 via filter circuit 86 comprising a capacitor 22, an inductor 24 coupled in series to a capacitor 26, which is coupled in parallel to lamp 14. A feedback voltage and current signal line is provided from lamp 14 to controller 20.

In accordance with one embodiment of the invention, high intensity discharge lamp 14 is operated is by a current frequency sweep within a sweep time, in combination with an amplitude modulated signal that has a second longitudinal mode frequency corresponding to the second longitudinal acoustic resonance mode of the discharge lamp. The second longitudinal mode frequency, $w_m$, is derived by first setting a lower limit second longitudinal mode frequency $w_L$, and an upper limit second longitudinal mode frequency $w_H$. The gas discharge lamp is then provided with a current signal that has a frequency sweep ranging between the first azimuth acoustic resonance mode frequency and the first radial acoustic resonance mode frequency, respectively corresponding to the first azimuth acoustic resonance mode of the lamp and the first radial acoustic resonance mode of the lamp.

The frequency swept current signal is then mixed with an amplitude modulated signal having frequency $w_m$ and a specified modulation index m (typically 0.09). The goal is to provide a voltage wave form at the lamp defined by Equation (1):

$$V(t) = A(1 + m \cos W_m t) \cos W_c(t) t \qquad (1)$$

where m is the modulation index, $W_m$ is the modulation frequency, $W_c(t)$ is the carrier frequency, and A is an amplitude. The modulation frequency falls within a 20–30 kHz range, while the carrier frequency is typically centered at about 50 kHz and swept about + or −5 kHz, at a rate that is very slow compared to either the carrier frequency or the modulation frequency. The lamp voltage is then measured. The amplitude modulated frequency $W_H$ is then decreased by a specified amount $\Delta f$ and then mixed again with the frequency swept current signal. The lamp voltage is repeatedly measured until the frequency of the amplitude modulated signal reaches $w_L$. A frequency vs. voltage curve is generated from $w_H$ to $w_Y$. The maximum in the lamp voltage corresponds to the frequency $w_{max}$, which is then utilized for color mixing, that is when $W_m$ is set to $w_{max}$.

In accordance with another embodiment of the invention, every time that the frequency swept signal is mixed with the amplitude modulated signal and a voltage measurement is taken, the amplitude modulated signal is turned off until the following voltage measurement.

In accordance with yet another embodiment of the invention a background subtraction mechanism is employed. To this end, the lamp voltage measurements are performed such that the lamp voltage signal values with amplitude modulation off before and after mixing the amplitude modulated signal with the swept frequency signal, are averaged and subtracted from the lamp voltage with amplitude modulation mixing on.

Once the color mixing frequency $w_{max}$ is determined, the frequency swept signal is mixed with an amplitude modulated signal having a frequency $w_H$ again. The amplitude modulation frequency is then decreased to frequency, $w_{max}$ and the modulation index m is increased to $m_{mix}$ which is a modulation index to be employed in color mixing mode (typically 0.24).

Figure 2A:
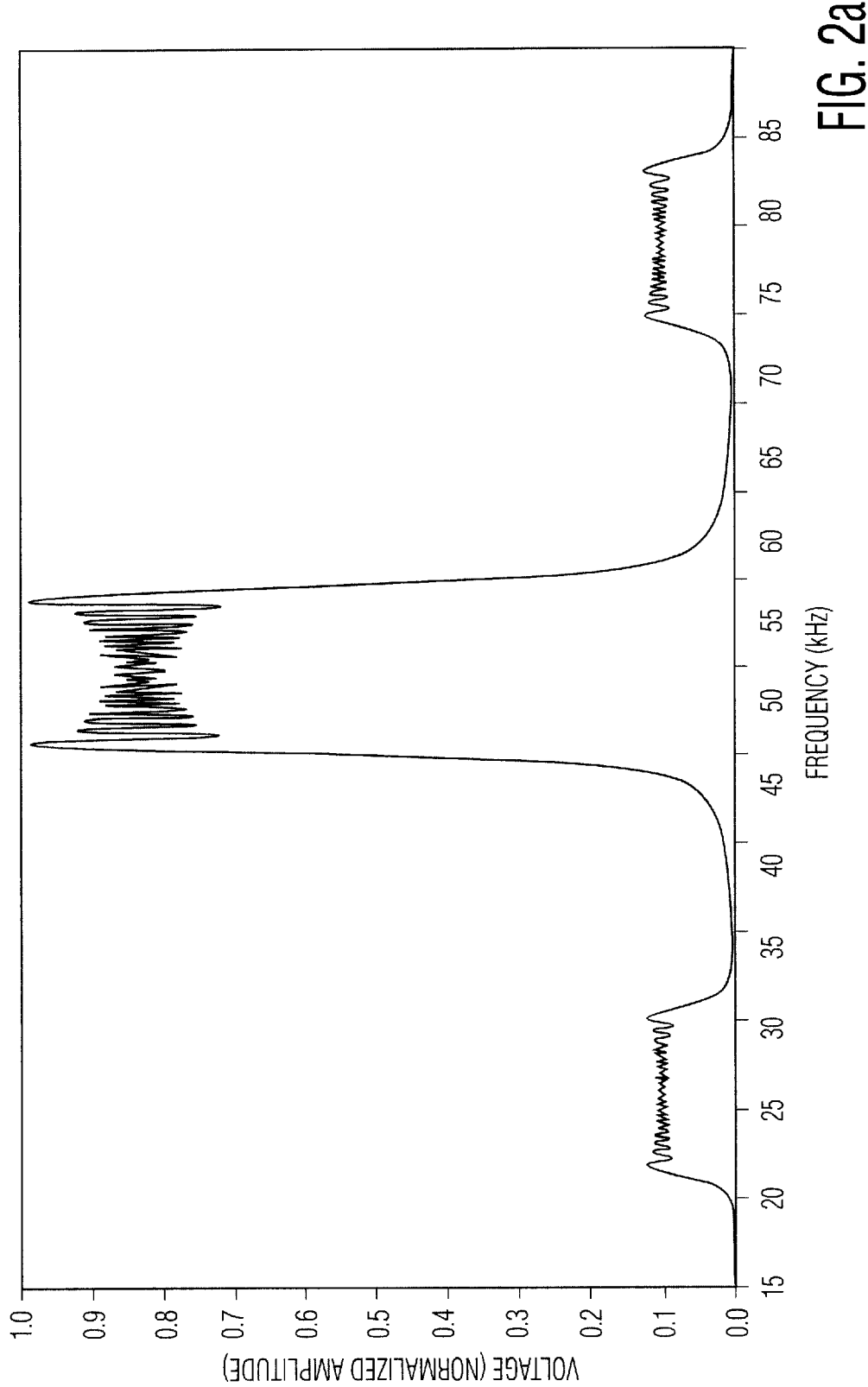

FIGS. 2a and 2b illustrate the frequency spectrum for an amplitude modulated signal provided by system 10 in accordance with one embodiment of the invention. Thus, FIG. 2a illustrates a voltage frequency vs. relative voltage graph of the amplitude modulated signal. In accordance with one embodiment of the invention, the sweep generator 12 provides a frequency swept signal ranging from 45 to 55 kHz as illustrated in FIG. 2a. The amplitude modulation signal provided by generator 94 has a frequency of 24 kHz and a modulation index of 0.24. As such the resultant signal at the output port of bridge 18 has a voltage frequency characteristics as depicted in FIG. 2a, wherein a center distribution between 45–55 kHz and two sidebands at 26 kHz and 74 kHz exist.

Figure 2C:
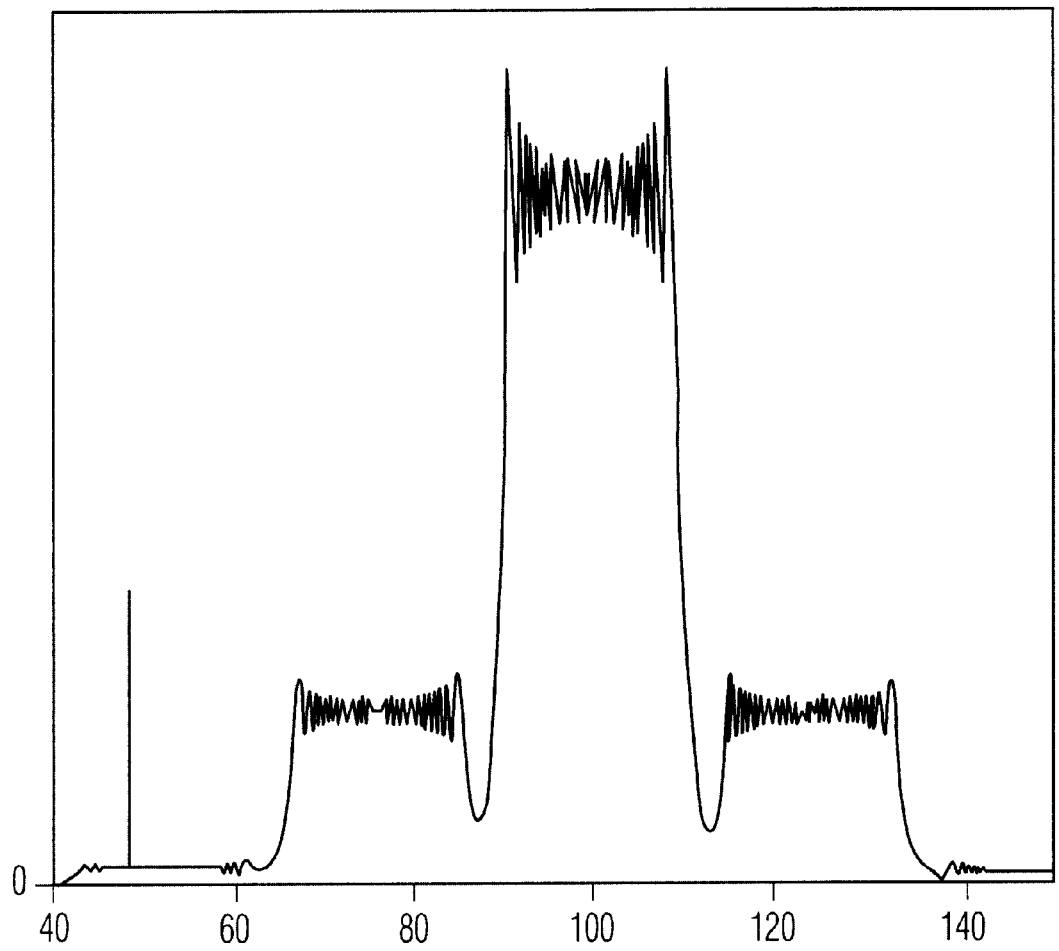

FIG. 2b represents the power frequency distribution, wherein a center distribution ranging from 90 kHz to 110 kHz and two sidebands at 76 kHz and 124 kHz exist along a fixed power frequency at the second longitudinal mode frequency of 24 kHz. FIG. 2c represents the same information as presented in FIG. 2a with a focus on the frequency range from 40 kHz-160 kHz.

Figure 3:
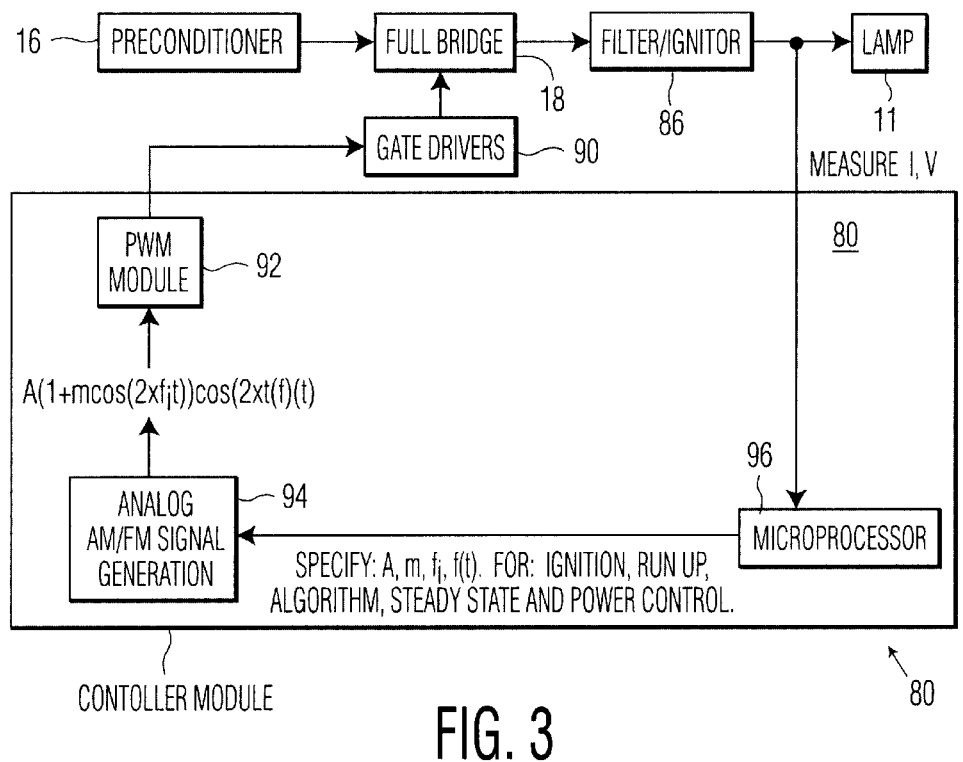
FIG. 3 is a block diagram of one embodiment of the ballast system of FIG. 1.

FIG. 3 illustrates a block diagram of a ballast system 80 in accordance with one embodiment of the invention. As explained with reference to FIG. 1, the lamp drive waveform is created by employing full bridge circuit 18 which provides the driving signal to lamp 14 via a filter/ignitor circuit 86. The MOSFETS contained in full bridge circuit 18 are driven by control signals generated by controller 20 and provided via gate driver circuit 90. In accordance with one embodiment of the invention, gate driver circuit 90 functions as an interface between controller 20 and full bridge circuit 18.

Controller 20 includes a microprocessor 96 which is configured to receive at its input port voltage and current measurement signals corresponding to the voltage and current signals provided to lamp 14. Microprocessor 96 performs the color mixing algorithm discussed above in reference with FIGS. 1 and 2. To that end, an output port of microprocessor 96 is coupled to an input port of an AM/FM signal generator 94, so as to provide the necessary signals for appropriate color mixing during the operation of the lamp. AM/FM signal generator 94 is configured to provide a small signal version of the waveform defined in equation (1) above. An output port of signal generator 94 is coupled to an input port of a pulse width modulation module 92.

Pulse width modulation module 92 is configured to generate a pulse signal corresponding to the waveform signal provided by generator 94. The output port of pulse width modulation module 92 is coupled to gate driver circuit 90. The pulse width modulation frequency is a fixed frequency greater than the highest frequency of the swept frequency, for example 250 kHz, 325 kHz, 500 kHz, etc.

Figure 4:
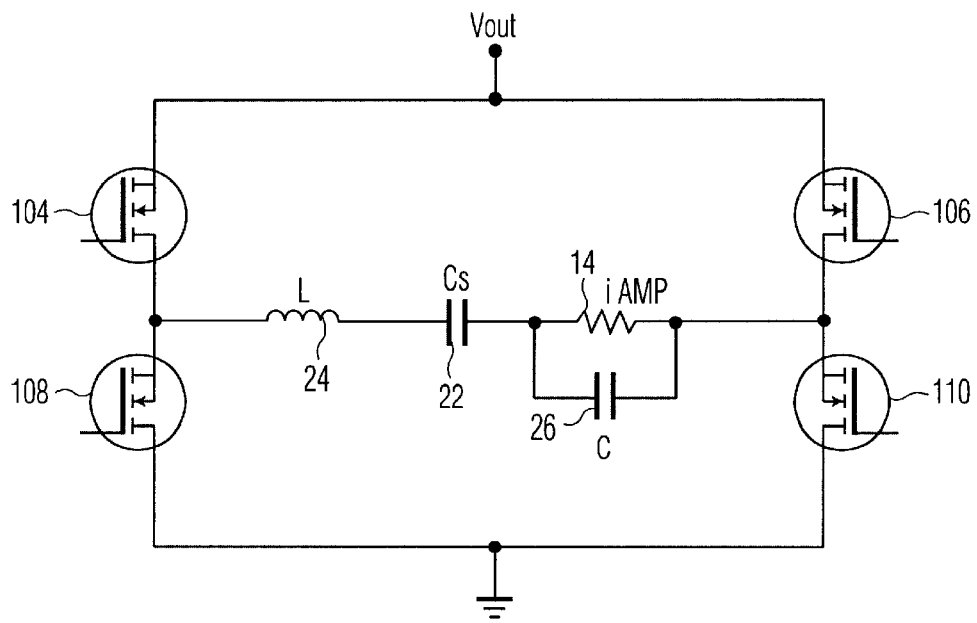
FIG. 4 is a diagram illustrating the bridge circuit shown in FIG. 1 configured as a full bridge circuit and connected to the filter/ignitor circuit of FIG. 1.

FIG. 4 illustrates one arrangement of full bridge circuit 18 in combination with filter/ignitor 86, in accordance with an embodiment of the invention. MOSFETS 104 through 110 are coupled together to form a full bridge circuit as commonly known in the art. Inductor 24 has an inductance L, and capacitors 22 and 26 have capacitances Cs and C respectively. The output signal provided by full bridge circuit 18 is an approximation of the desired waveform in addition to higher frequency components. Thus, one requirement for the filter is that it sufficiently attenuates the unwanted higher frequency components. In addition, the filter preferably compensates for the lamp's negative differential resistance.

The pulse signals generated at the output port of pulse width modulation module 92 drive the transistors contained in full bridge circuit 18, which remarkably cause the full bridge circuit to generate the desired waveform required by the color mixing arrangements described above in reference with FIGS. 1 and 2. In accordance with two embodiments of the invention, two types of pulse width modulation methods are considered although the invention is not limited in scope in the type of the pulse width modulation employed by PWM module 92. The two types of modulation are preferably symmetrical and asymmetrical pulse width modulation arrangements. In either case, the voltage signal provided to PWM module 92 is a low voltage version of the desired lamp drive waveform. The output signal of the PWM module 92 is a pulse width modulated gate drive signal that operates full bridge circuit 18.

Figure 5:
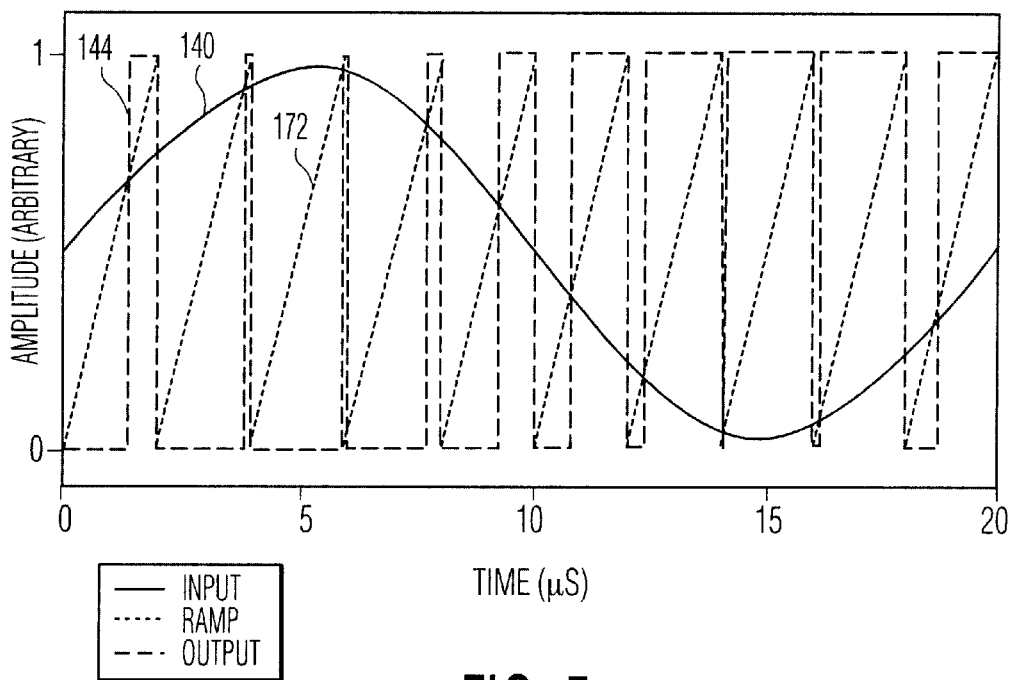
FIG. 5 is a diagram illustrating an asymmetrical pulse width modulation scheme in accordance with one embodiment of the present invention.
Figure 6:
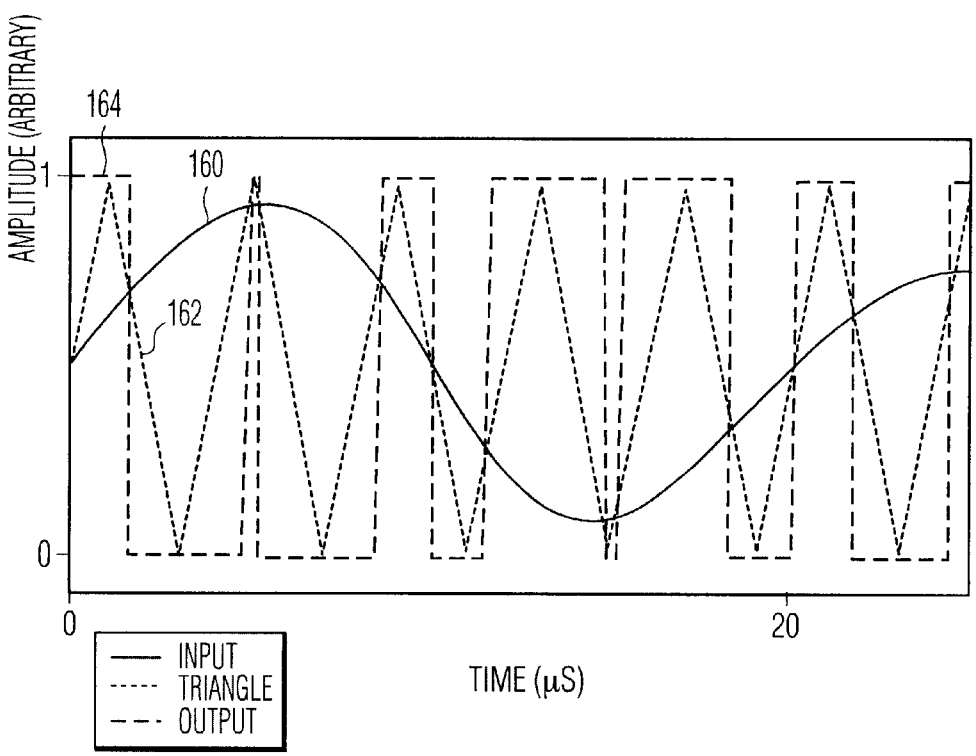
FIG. 6 is a diagram illustrating a symmetrical pulse width modulation scheme in accordance with another embodiment of the present invention.

FIG. 5 illustrates a plot of an asymmetrical pulse width modulation arrangement. Signal curve 172 is an asymmetrical ramp signal that is internally generated by pulse width modulation (PWM) module 92. Signal curve 140 is the voltage signal provided to the input port of PWM module 92, which is the desired color mixing waveform with a dc level added equal to half the peak voltage of the ramp signal. As illustrated, during each cycle of the ramp the PWM module output signal 144 goes high when the ramp first equals the input signal and resets at the end of each PWM cycle when the ramp signal resets, providing the resulting output pulse signal 144. The output signal generated by bridge circuit 18 is ideally the same as the pulse signal 144 with the dc level removed and the amplitude increased. FIG. 6 illustrates a plot of a symmetrical pulse width modulation arrangement. Signal curve 162 is a symmetrical ramp signal that is internally generated by pulse width modulation (PWM) module 92 in accordance with another embodiment of the invention. Signal curve 160 is the voltage signal provided to the input port of PWM module 92, which is the desired color mixing waveform with a dc level added equal to half the triangle peak voltage so that the average pulse width is approximately 50% of the PWM period and the bridge output signal will contain no dc signal components. As illustrated the symmetrical ramp signal 162 is triangular shaped in accordance with one embodiment of the invention.

During each period of the triangular waveform the output of PWM module 92 goes high when the triangle first exceeds the input signal and subsequently goes low when the input signal first exceeds the triangle. The minimum pulse width produced is determined by the maximum value of the input waveform. Thus the amplitude of input signal 160, determines the range of the pulse widths used. While an ideal bridge circuit can operate with 0–100% pulse width modulation, in practice a 10%–90% modulation is the preferred range of operation. Operation with 5%–95% pulse modulation is also possible.

PWM module 92 advantageously employs a symmetrical pulse width modulation arrangement as discussed in reference with FIG. 6 as a preferred mode of operation. The symmetrical method utilizes information about the input waveform signal for both the low-to-high and high-to-low output transitions, whereas the asymmetrical method only uses input information for the low-to-high transition with the high-to-low transitions occurring at the end of a PWM cycle.

Figure 7:
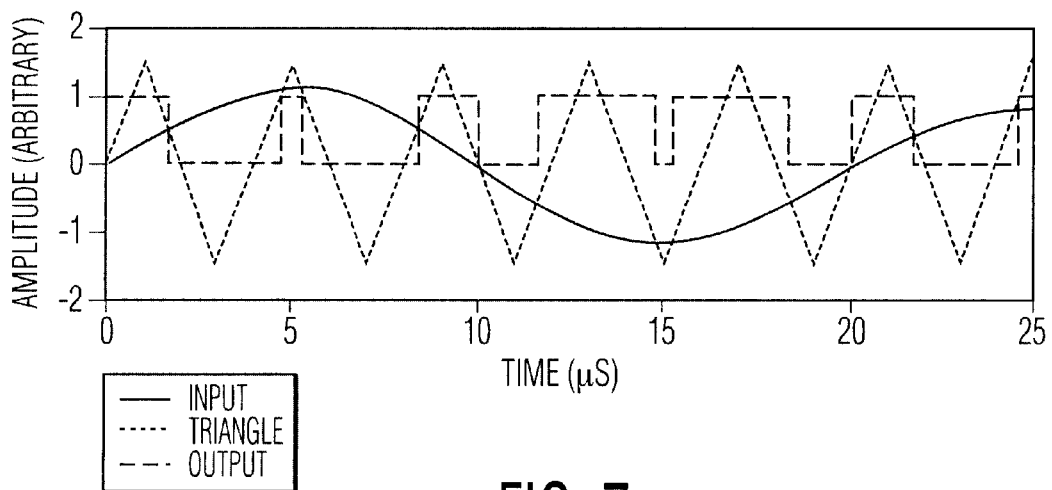
FIG. 7 is a diagram illustrating signals that correspond to a symmetrical pulse width modulation scheme for amplitude modulation in accordance with one embodiment of the present invention.

FIG. 7 illustrates signal curves corresponding to a symmetrical pulse width modulation arrangement for amplitude modulation of a carrier frequency signal fixed at 50 kHz (no sweep). The input modulation index is set at 0.25 and the AM frequency is set at 24 kHz. The amplitude of the input waveform relative to the triangle amplitude is set to yield 10–90% pulse width modulation. It is noted that the PWM range is determined by the maximum and minimum values of the input signal relative to the amplitude of the triangle signal. From Equation (1), it follows that the maximum is $A(1+m)$ and the minimum is $-A(1+m)$, wherein A is the amplitude of the carrier frequency and m is the modulation index for amplitude modulation. The value of A associated with a given PWM range is thus a function of modulation index m. The PWM rate for the example illustrated in FIG. 7 is set to 250 kHz.

Figure 8:
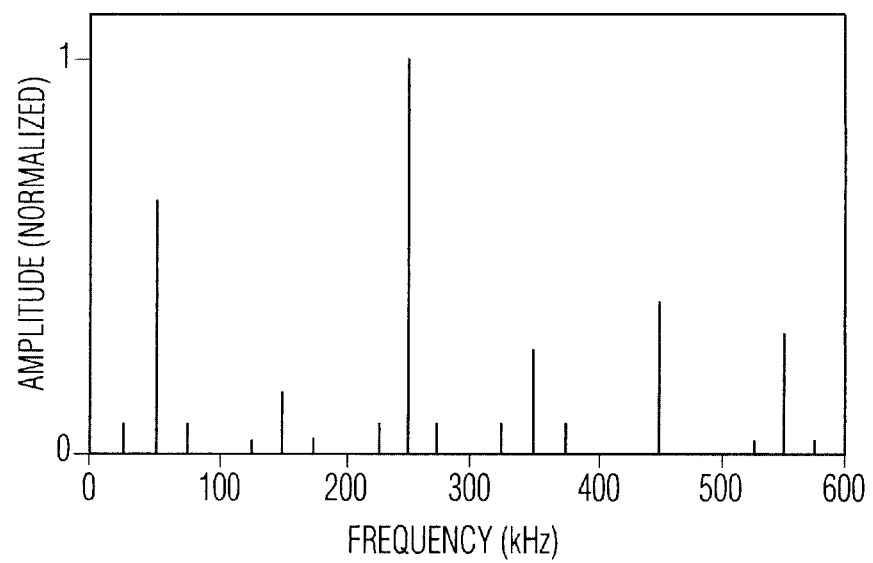
FIG. 8 illustrates a normalized voltage spectrum wherein a 45 kHz-55 kHz frequency sweep is represented by a fixed 50 kHz at 250 kHz bridge circuit operation in accordance with one embodiment of the present invention.

FIG. 8 illustrates the normalized voltage spectrum of the resulting output signal (gate drive) waveform minus the DC component, and without the frequency sweep. As illustrated in FIG. 8, the reproduction of the desired spectrum in the 0–100 kHz range is quite satisfactory. The side band amplitudes are equal to within better than 0.1%. The ratio of side band amplitude to carrier amplitude is 0.122 compared to an input value of 0.125, an error of around −2.4%. There are unwanted frequency components that filter 86 has to deal with. For example, those components centered at around 150 kHz need to be attenuated, but are relatively close to frequency components that should not be attenuated.

Figure 9:
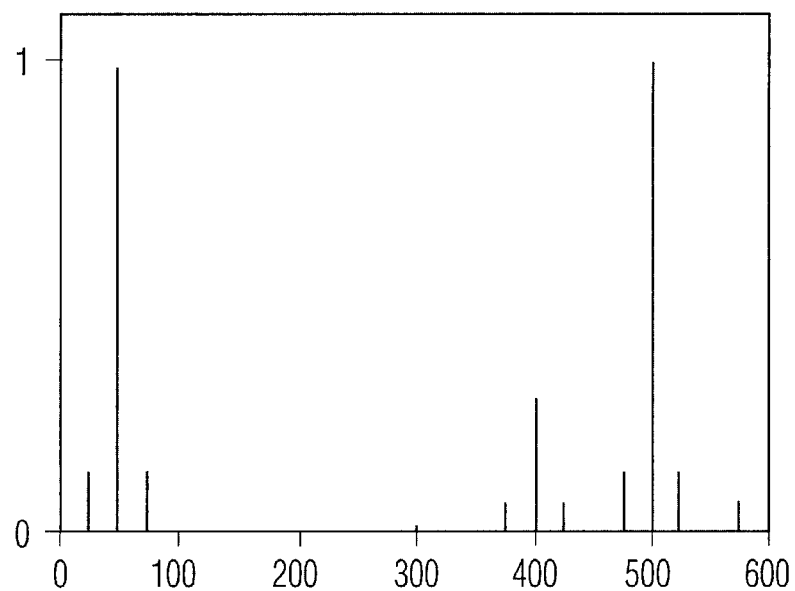
FIG. 9 illustrates a normalized voltage spectrum where the 45 kHz-55 kHz frequency sweep is represented by a fixed 50 kHz at 500 kHz bridge operation in accordance with another embodiment of the present invention.

FIG. 9 illustrates a frequency spectrum for an arrangement where the pulse width modulation frequency has increased to 500 kHz. The ratio of side band to carrier amplitude is now exact to three digits, i.e. 0.125. The unwanted frequency components have shifted to substantially higher frequency ranges. This lessens the requirements for the filter at the cost of increased operation stress on full bridge 18. Thus in reference with the frequency ranges discussed above in reference with FIG. 2 corresponding to a color mixing arrangement of the present invention, the preferred pulse width modulation frequency is about 250 kHz or greater for a symmetrical pulse width modulation arrangement. For an asymmetrical arrangement the frequency of the pulse width modulation is preferably about 325 kHz or greater, in order for the voltage frequency spectrum of the desired waveform to exhibit acceptable characteristics in view of filter 18 considerations as discussed above in reference with FIGS. 7 and 8.

Figure 10:
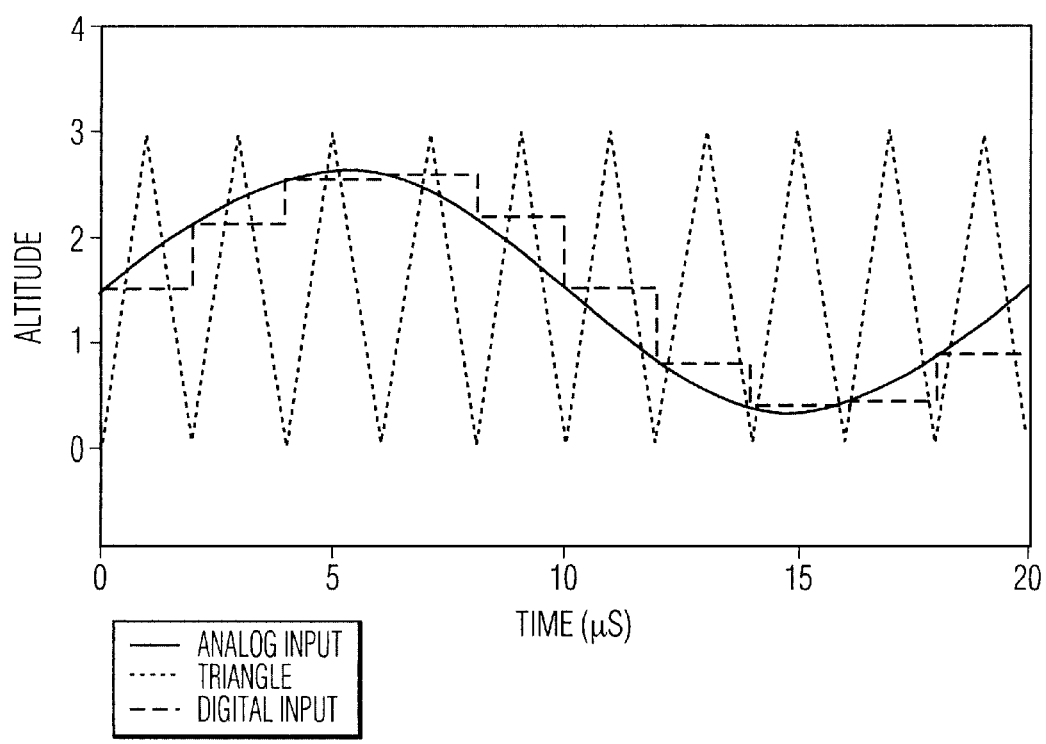
FIG. 10 illustrates a comparison of pulse signals, in accordance with one embodiment of the present invention.
Figure 11:
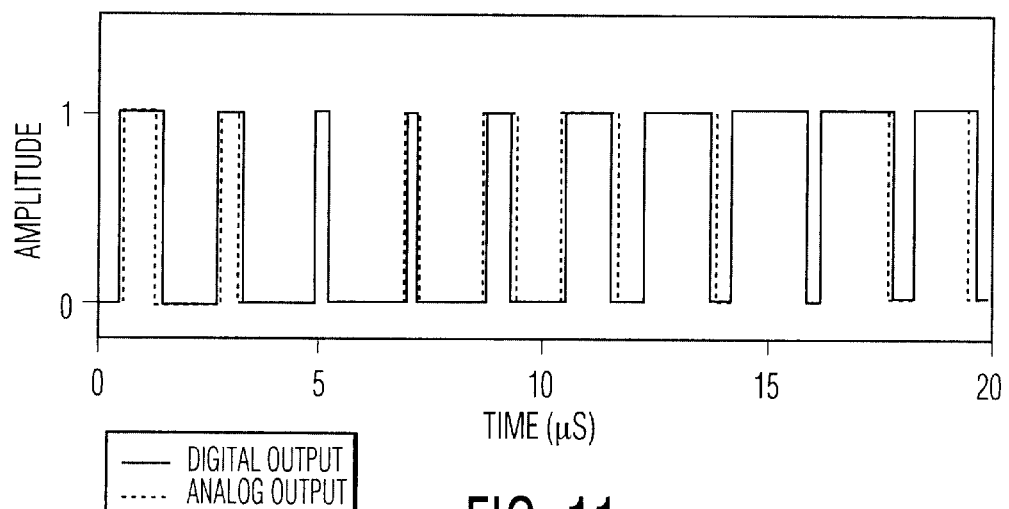
FIG. 11 illustrates a comparison of analog vs. digital pulse signals, in accordance with one embodiment of the present invention.

As noted above, the components contained in controller 20 include digital hardware instead of analog hardware in accordance with another embodiment of the invention. Thus, AM/FM signal generator 94 employs a digital signal processor that computes one value of the input waveform during each PWM cycle. This value corresponds to the amplitude of the analog input waveform at the start of the PWM cycle. This is illustrated in FIG. 10, wherein a pulse width modulation frequency of 500 kHz is employed, with a modulation index of 0.25, and 10–90% pulse width modulation width. FIG. 11 illustrates a comparison of the pulse signals generated by PWM module 92 for digital and analog arrangements. For operation values discussed above in reference with FIGS. 2, 7 and 8, a pulse width modulation rate in the range of 325 kHz to 500 kHz provides a satisfactory result for most applications. The design of filter 86 is discussed hereinafter in accordance with various embodiments of the present invention. In steady state operation, a frequency sweep of 45–55 kHz with a 24 kHz AM signal is employed. In the voltage frequency spectrum, this results in the highest frequency of 79 kHz (55 kHz+24 kHz) and a lowest frequency of 21 kHz (45 minus 24). The color mixing algorithm allows for operation with AM frequencies of 20–30 kHz and thus a total frequency range of about 15 kHz (45 minus 30) to 85 kHz (55 plus 30). The unwanted frequency components occur at frequencies as low as about 100 kHz, depending among other things, on the PWM scheme and PWM frequency. Thus, filter 86 preferably has a flat frequency response from 15 kHz to 85 kHz and is strongly attenuating by 100 kHz. The filter is preferably low order without relatively large magnetic components.

In accordance with one embodiment of the invention a filter without a flat frequency response is employed that still provides a power frequency spectrum that meets the lamp specification for proper color mixing. The series capacitor 22 is used as a DC blocking capacitor. Thus, in one example, in accordance with an embodiment of the invention inductor 24 has inductance L=1.6 mH, capacitor 26 has capacitance C=1.2 nF, capacitor 22 has capacitance Cs=2.2 $\mu$F, and equivalent resistance of lamp 14 is R=533 $\Omega$. Thus, the filter is designed such that the unloaded resonant frequency (115 kHz) is above any of the frequency components of the voltage frequency spectrum of the desired lamp drive waveform. Furthermore, one third of the resonant frequency (38.3 kHz) is located in an unused portion of the frequency spectrum, between the swept carrier frequency (45 kHz–55 kHz) and the full range of the lower AM side band during color mixing operation (15 kHz–35 kHz).

Figure 12:
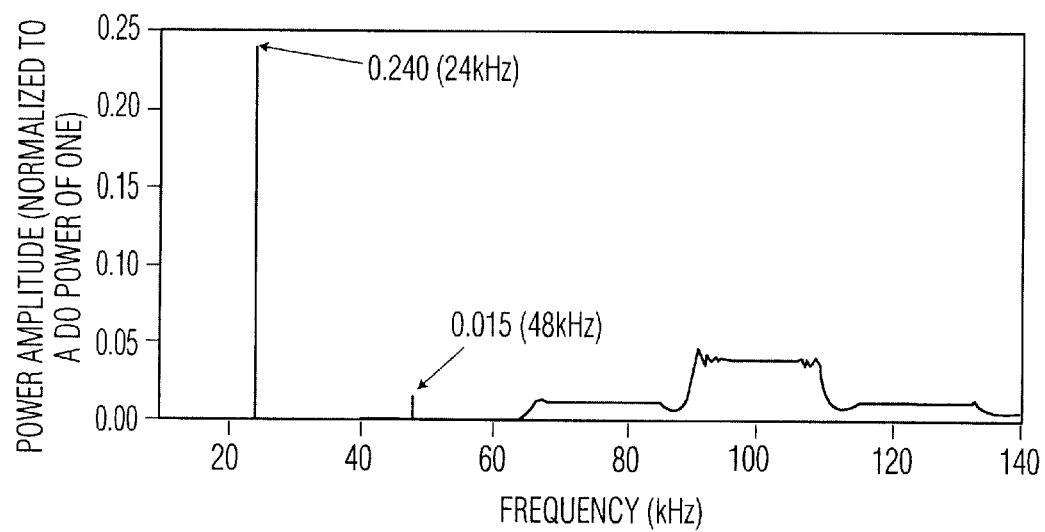
FIG. 12 illustrates a normalized power spectrum, in accordance with one embodiment of the present invention.

FIG. 12 illustrates the power spectrum normalized to a dc component of one. With this normalization and an input m value of 0.25, the amplitude of the 24 kHz fixed frequency component should have been 0.242 as derived by $m/(1+m^2/2)$. The distortion in the voltage spectrum has caused an error of less than 1% in the m value. As the fixed frequency component is varied from 20 kHz to 30 kHz, the output amplitude at the fixed frequency varies from 0.242 at 20 kHz to 0.239 at 30 kHz, a total of about 1.3%. The power varies over the frequency sweep by about +/−6.5%. This power fluctuation may lead to a visible flicker, which according to one embodiment of the invention is corrected by providing an offsetting amplitude increase with increasing frequency over the frequency sweep. Furthermore, in accordance with another embodiment of the invention, when an increase in power to lamp 14 is desired, it is possible to increase the bus voltage in bridge circuit 18, while the modulation index m is also increased. For example, for a power requirement of 75 W, a bus voltage of around 527V and a modulation index m=0.3 would result in proper filter characteristics and satisfactory color mixing arrangement.

In accordance with another embodiment of the invention the resonant frequency is set to around 87.7 kHz and one third of the resonant frequency to 29.2 kHz. This produces among other things three desirable results. First, the transfer function assumes a high value, for example greater than one, in the frequency range of about 50 kHz. This results in lower required bus voltage $V_{BUS}$ in the bridge circuit. Second, the transfer function is relatively flat in that region. Third, the attenuation of unwanted higher frequency components are relatively effective with lower bus voltages and modulation index values as compared to the design discussed in reference with FIG. 11. For example, an output power of 75 W requires a bus voltage of 407V and a modulation index m=0.28.

Figure 12A:
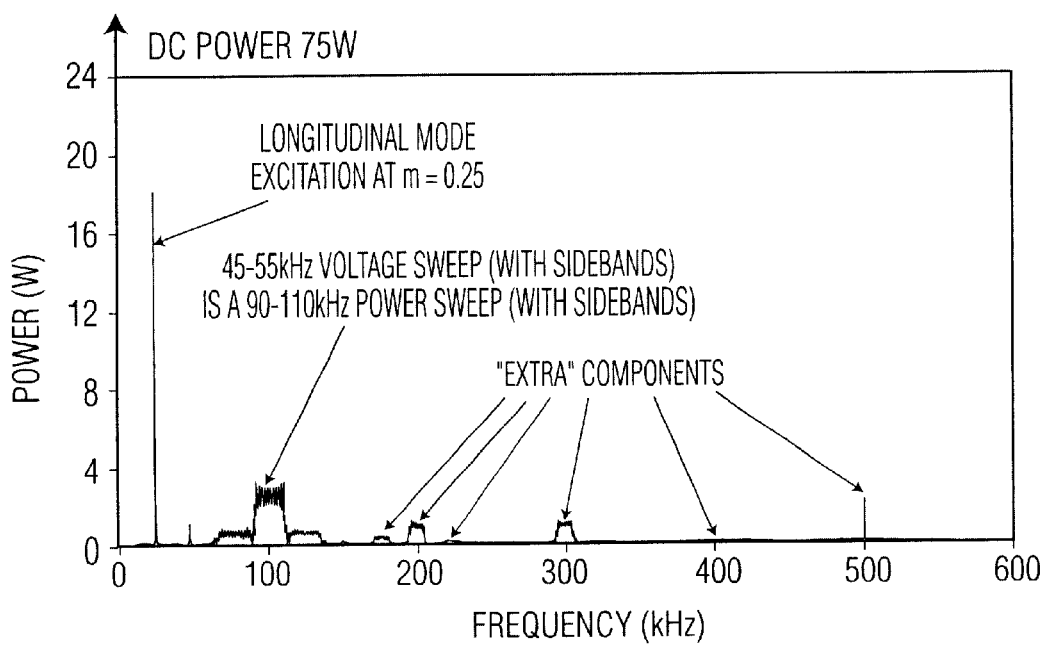
FIG. 12A illustrates the resulting lamp power spectrum, up to and including 500 kHz, produced by the ballast system of FIGS. 1 and 3.

Referring to FIG. 12A, there is shown the typical lamp power spectrum that results from powering the lamp with the ballast system of FIGS. 1 and 3.

When performing symmetrical pulse width modulation as shown in FIG. 7, the triangular waveform shown as a dotted line in FIG. 7 (and as waveform 162 in FIG. 6) has a fixed frequency referred to as the bridge frequency. As previously discussed, this frequency is preferably at least 250 kHz. Referring to FIG. 12A, it is desirable to reduce the amplitude of the power frequency components labeled as "extra components". In accordance with the invention, this is accomplished by using ballast system 200 shown in FIG. 13 which utilizes a controller that effects sweeping of the bridge frequency (i.e. sweeping the frequency of waveform 162 shown in FIG. 6) and a filter/ignitor circuit that is configured to provide relatively improved attenuation of undesirable power spectral components when compared to filter/ignitor circuit 86.

Figure 13:
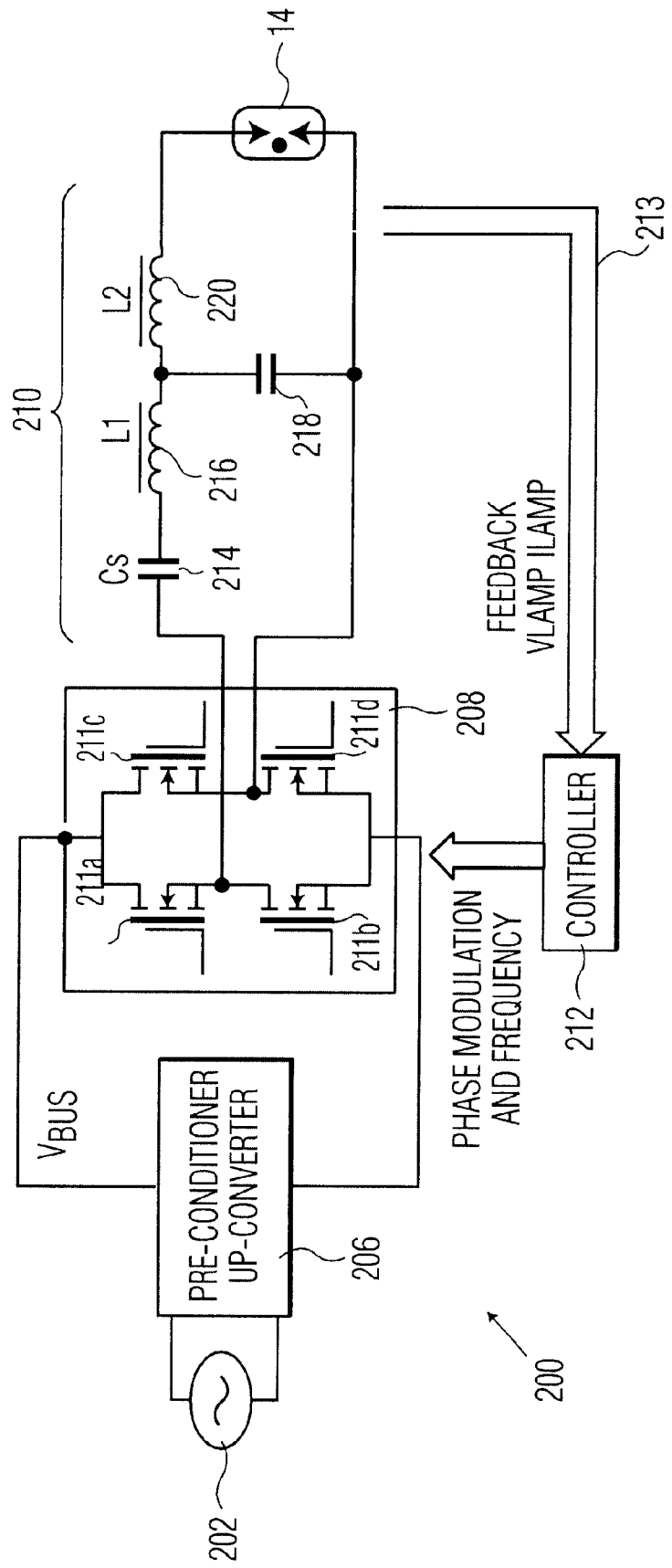
FIG. 13 is a block diagram of another embodiment of the ballast system of the present invention.

Referring to FIG. 13, ballast system 200 comprises mains power supply 202 which provides an AC current signal to a high and low voltage supply bus $V_{BUS}$ that is ultimately employed to drive HID lamp 204. Ballast system 200 includes a pre-conditioner and up converter 206 which is configured to receive a rectified version of mains power supply signal and shape the ballast supply current, also referred to as mains current, for power factor correction. Pre-conditioner and up-converter 206 includes a boost converter (not shown), whose operation is well known in the art. Mains power supply 202 and pre-conditioner and up-converter 206 function in the same manner as mains power supply 12 and pre-conditioner and up-converter 16, respectively, described in the foregoing description.

Ballast system 200 further includes ballast bridge unit 208 which is configured to receive the signal provided by pre-conditioner and up-converter unit 206. Ballast bridge unit 208 functions as a commutator that alternates the polarity of voltage signal provided to HID lamp 14 via filter circuit 210. Ballast bridge unit 208 comprises four MOSFET transistors 211a–d that are coupled together to form a full bridge circuit as commonly known in the art. The MOSFETS are switched to provide alternating signal paths for the signal carried in the power voltage signal buses $V_{BUS}$. Ballast bridge unit 208 has the same circuit configuration as ballast bridge unit 18 described in the foregoing description. However, in accordance with this embodiment of the present invention, the operating frequency of bridge unit 208 is periodically swept from a first frequency to a second frequency. The purpose of sweeping the operating frequency of the bridge circuit 208 is described in the ensuing description.

Figure 14:
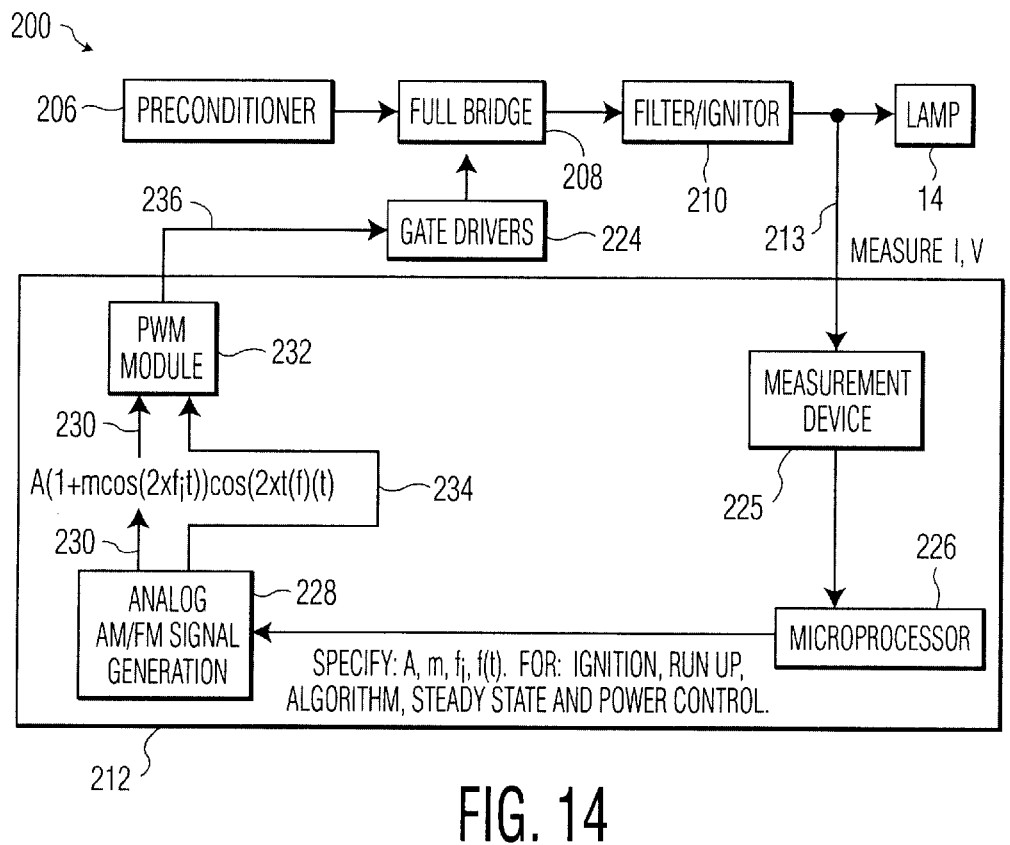
FIG. 14 is one embodiment of the ballast system of FIG. 13.
Figure 15:
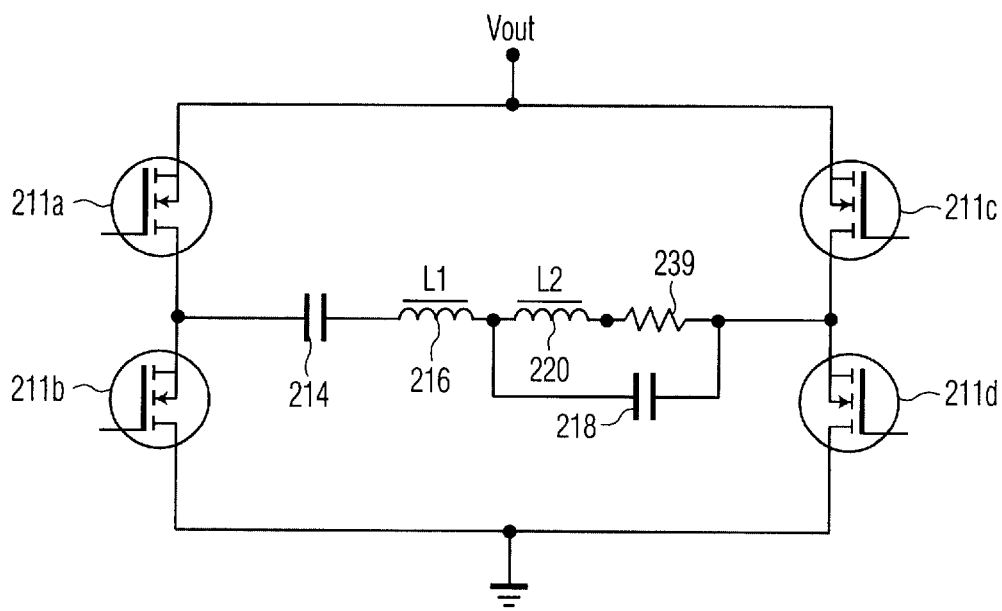
FIG. 15 illustrates one arrangement of a full bridge circuit in combination with a filter/ignitor, in accordance with one embodiment of the present invention.

Referring to FIGS. 13–15, MOSFETS 211a–d are driven by control signals generated by controller 212 and provided via gate driver circuit 224. Gate driver circuit 224 functions as an interface between controller 212 and full bridge circuit 208. The output port of the ballast bridge unit 208 is coupled to a high intensity discharge (HID) lamp 14 via filter/ignitor circuit 210. Filter/ignitor circuit 210 is described in detail in the ensuing description. A feedback voltage and current signal line 213 is provided from lamp 14 to controller 212.

HID lamp 14 is operated by a current frequency sweep within a sweep time, in combination with an amplitude modulated signal that has a second longitudinal mode frequency corresponding to the second longitudinal acoustic resonance mode of the discharge lamp in the manner as described in the foregoing description pertaining to the embodiments shown in FIGS. 1 and 3. Similar to ballast system 10, ballast system 200 utilizes a background subtraction mechanism which was described in the foregoing description.

Referring to FIG. 14, AM/FM signal generator 228 is configured to function in generally the same manner as AM/FM signal generator 94 discussed in the foregoing description (see FIG. 3). Thus, AM/FM signal generator 228 generates signal 230 which is a small signal version of the waveform defined in Equation (1) described in the foregoing description. Signal 230 is inputted into pulse width modulation module 232. In accordance with the invention, AM/FM signal generator 228 is configured to also generate signal 234 that is also inputted into pulse width modulation module 232 and effects sweeping of the waveform 162 shown in FIG. 6. In response to signals 230 and 234, pulse width modulation module 232 outputs signal 236. Signal 236 is inputted into gate driver circuit 224. Gate driver circuit 224 is configured to control ballast bridge unit 208 in accordance with the characteristics of signal 236. In response, the frequency at which the ballast bridge unit 208 operated is swept as the bridge circuit 208 outputs the desired waveform to effect color mixing as described in the foregoing description relating to the embodiments of FIGS. 1 and 3.

Controller 212 includes measurement device 225 that measures the voltage and current signals applied to lamp 14 and generates data signals that represent the measured current and voltage signals. Controller 212 further includes microprocessor 226 which is configured to receive and process the data signals generated by measurement device 225. Device 225 measures the voltage spectrum applied to lamp 14 as well as the current spectrum of current flowing through lamp 14. Device 225 calculates the power frequency components of the spectrum using a Fourier Transform of the product of the measured voltage and current waveforms. Device 225 can be configured as any of the commercially available programmable network or spectrum analyzers that are capable of performing FFT (Fast Fourier Transform) calculations. A suitable software program for performing FFT calculations is contained in the software program Labview™ manufactured by National Instruments. Microprocessor 226 receives and processes the data signals outputted by device 225. Microprocessor 226 performs the color mixing algorithm discussed in the foregoing description relating to the embodiment of FIGS. 1 and 3. Microprocessor 226 includes an output port that is coupled to an input port of AM/FM signal generator 228 so as to provide the necessary signals for appropriate color mixing during the operation of the HID lamp 14.

Figure 16:
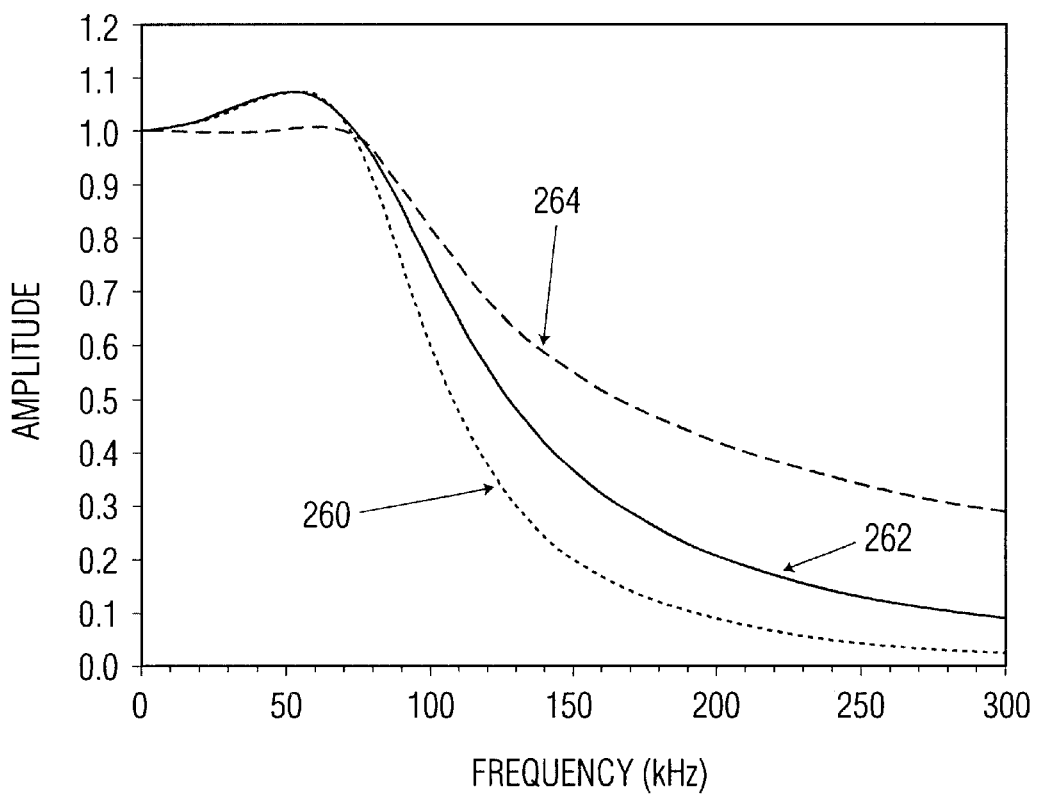
FIG. 16 illustrates the amplitude response over frequency for the filter/ignitor circuits shown in FIGS. 1 and 13.

Referring to FIG. 15, the circuit comprising the MOSFETS of the bridge circuit 208 and filter/ignitor circuit 210 are shown. Filter/ignitor circuit 210 comprises elements 214, 216, 218, and 220. Lamp 14 is represented by resistor 239. Inductor 216 has inductance L1. Inductor 220 has inductance L2. Capacitors 214 and 218 have capacitances C1 and C2, respectively. In one embodiment, L1 is 1.27 mH (millihenries), L2 is 0.5 mH, capacitance C1 is 2.2 $\mu$F (microfarads) and capacitance C2 is 5 nF (nanofarads). It is to be understood that these component values relate to just one embodiment of filter/ignitor circuit 210 and that other suitable component values can be used. It is also to be understood that the filter/ignitor circuit 210 can be used with the ballast systems shown in FIGS. 1 and 3. In fact, filter/ignitor circuit 210 exhibits significantly improved filtering characteristics when compared to filter/ignitor circuit 86. In particular, filter/ignitor circuit 210 provides significantly improved attenuation of unwanted higher frequencies. FIG. 16 compares the amplitude portion of the transfer functions of the filter/ignitor circuits 86 and 210. The desirable features of filter/ignitor circuit 210 are increased attenuation at the bridge frequency (250 kHz or higher) and no change in the transfer function below about 100 kHz. This has the effect of reducing the amplitude of the "extra components" without sacrificing any of the positive features of filter/ignitor circuit 86.

Test Data

FIG. 16 shows the amplitude portions of the transfer functions for filter/ignitor circuits 86 and 210 for the following conditions:

a) the ballast system shown in FIGS. 1 and 3 was used for the test;

b) the ballast bridge unit frequency was fixed at 250 kHz;

c) the component values of filter/ignitor circuit 86 were those described in the foregoing description;

d) the component values of filter/ignitor circuit 210 were those described in the foregoing description;

e) a 533 ohm resistor was used to simulate the HID lamp 14; and f) a voltage bus $V_{BUS}$ of 415 volts was used thereby producing a DC power of 75 watts applied to the 533 ohm resistor.

Dotted line 260 refers to the amplitude portion of the transfer function of filter/ignitor circuit 210. Solid line 262 refers to the amplitude portion of the transfer function of filter/ignitor circuit 86. Dashed line 264 refers to the ratio A1/A2 for each frequency wherein A1 is the amplitude portion of the transfer function of filter/ignitor circuit 210 and A2 is the amplitude portion of the transfer function of filter/ignitor circuit 86. As shown by FIG. 16, for steady state color mixing with a longitudinal mode power frequency of 24 kHz, the highest frequency component of the desired voltage waveform is about 79 kHz (the highest frequency of the upper side band, 55 kHz+24 kHz). At 150 kHz, the ratio A1/A2 is 0.54. Thus, filter/circuit 210 provides an extra factor of 1.8 attenuation. At 250 kHz, the ratio A1/A2 decreases to 0.34. Thus, filter/circuit 210 provides an extra factor of 2.9 attenuation.

Figure 17:
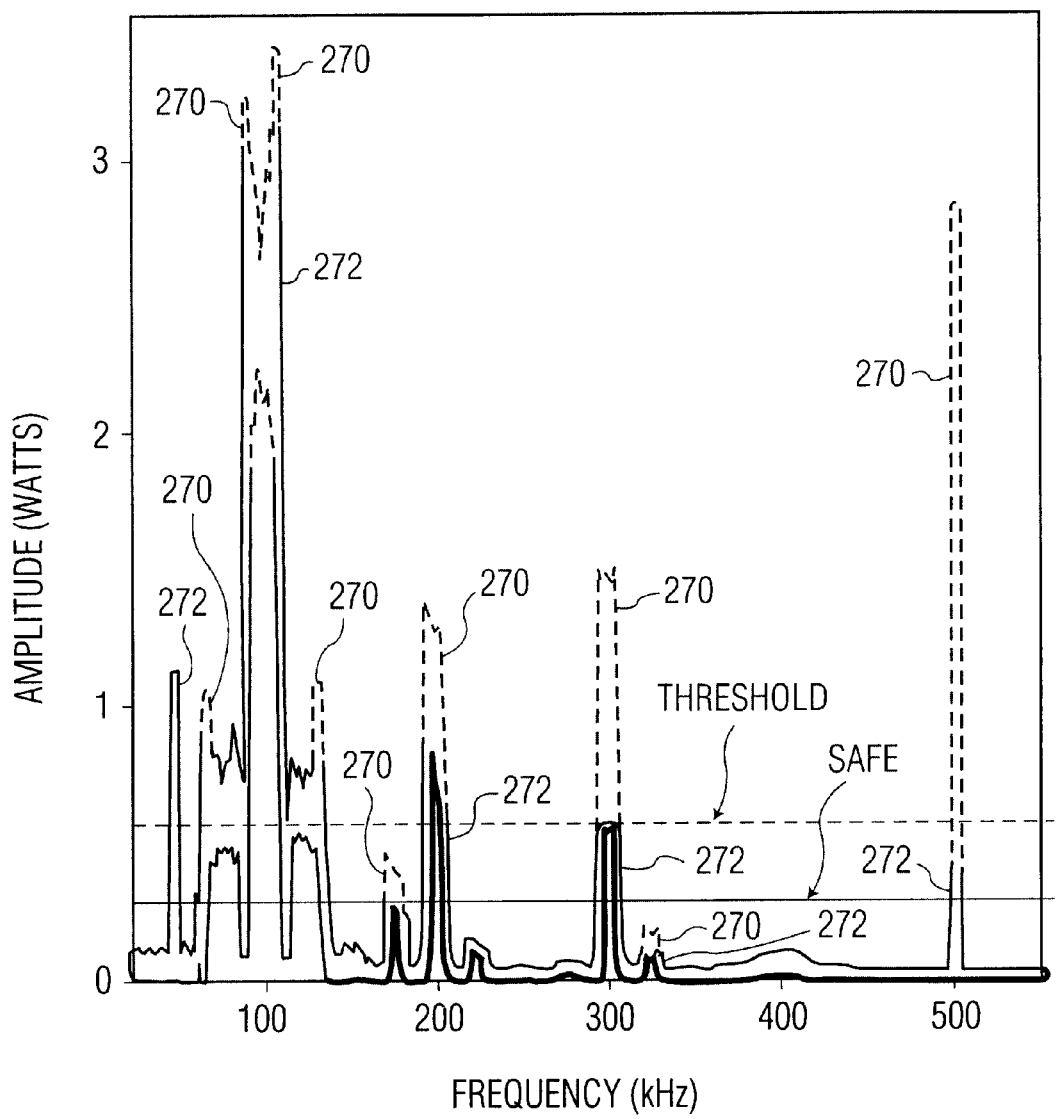
FIG. 17 illustrates the normalized lamp power spectrum for the ballast systems shown in FIGS. 3 and 14.

Filter/ignitor circuits 86 and 210 were also tested in order to evaluate performance during steady state color mixing. FIG. 17 shows the results for this test. In this test, the power spectrum was computed for the following conditions:

a) 10%–90% pulse width modulation;

b) a fixed bridge frequency of 250 kHz;

c) a 533 ohm resistor was used to simulate lamp 14; and d) a voltage bus $V_{BUS}$ of 415 volts was used thereby producing a DC power of 75 watts applied to the 533 ohm resistor.

e) a voltage bus $V_{BUS}$ of 415 volts was used thereby producing a DC power of 75 watts applied to the 533 ohm resistor.

In FIG. 17, dotted portions 270 refer to the amplitude response when using filter/ignitor circuit 86. Solid lines 272 refer to the amplitude response when using filter/ignitor circuit 210. As shown in FIG. 17, filter/ignitor circuit 210 substantially reduces the power components at about 200 kHz and 300 kHz in comparison to filter/ignitor circuit 86.

The combination of sweeping the bridge frequency of bridge circuit 208 and filter/ignitor circuit 210 effects accurate reproduction of the desired power frequency spectral components shown in FIG. 2b. In a preferred embodiment, the swept frequency is greater than 250 kHz and the sweep rate (Hz/s or Hertz/second) is slow enough that negligible frequency change occurs during one PWM cycle so as to maintain the aforesaid desired power frequency spectral components shown in FIG. 2b. At a bridge frequency of 250 kHz, one PWM ("pulse width modulation") cycle is 4 μs (micro seconds). Thus, the effect of the bridge frequency sweep is to modify the voltage spectrum component at the bridge frequency and consequently the amplitude of the "extra components" in the power spectrum.

Figure 17A:
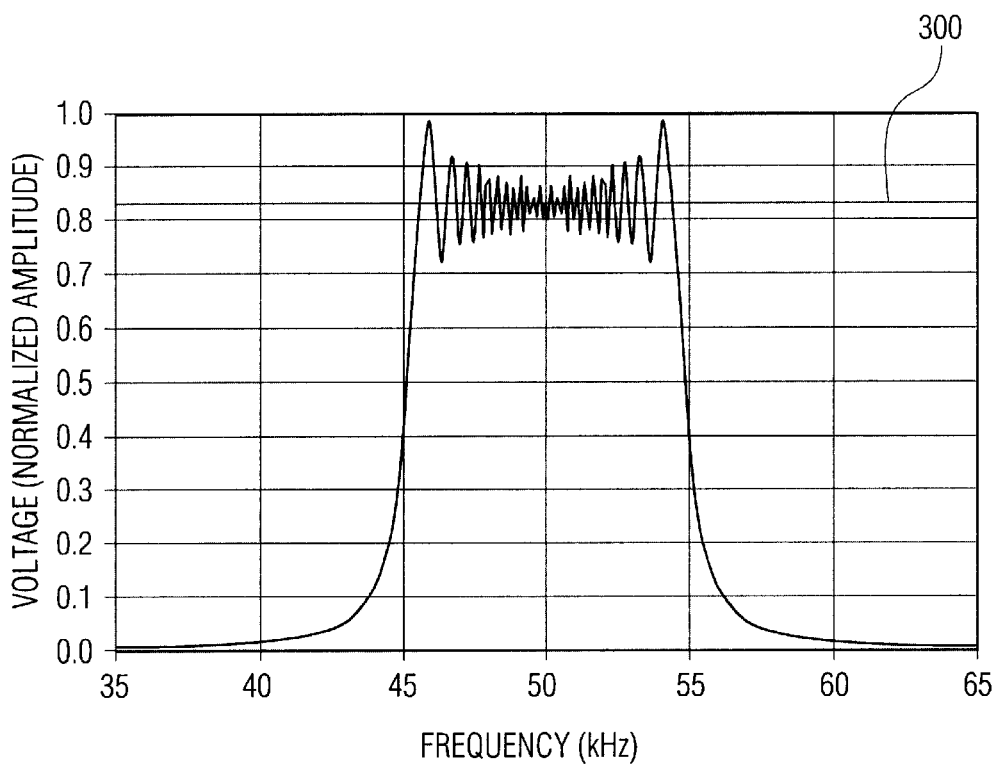
FIG. 17A illustrates a spectral component that typically occurs in the lamp power spectrum.

Referring to FIG. 17a, there is shown a spectrum component of the general type that occurs in the power spectra. Horizontal line 300 represents an average amplitude value across the top of the component. Therefore, a component's amplitude may be characterized by the average value. Similarly, relative amplitudes can be characterized by ratios of these average amplitude values. Referring to FIG. 17, the components centered at 100 kHz and its side bands closely resemble the spectrum component shown in FIG. 17a. To a lesser extent, the components above 150 kHz also resemble spectrum component shown in FIG. 17a. When it is stated that extra components should have amplitudes 7.8 dB or preferably 10.8 dB below the amplitude of the component centered a 100 kHz, the term "amplitude ratio" refers to the ratio of the single values corresponding to the amplitudes of the corresponding horizontal lines 300. However, since some components do not have flat tops (on the average), the determination of amplitude ratio becomes inaccurate. The nonlinear bridge frequency sweep substantially flattens the tops of the components thereby facilitating determination of amplitude ratios.

Specifically, it is preferable that the amplitudes of the aforesaid "extra components" are at least 7.8 dB lower than the amplitude of the component at 100 kHz. More preferably, the amplitudes of the "extra components" are at least 10.8 dB lower than the amplitude of the component at 100 kHz. Such additional attenuation is achieved by using the combination of the attenuation provided by filter/ignitor 210 and the attenuation provided by frequency sweep of the bridge frequency as described in the foregoing description.

FIG. 17 shows the power spectra resulting from using filter/ignitor 210 as opposed to filter ignitor 86 but without a bridge frequency sweep. The amplitude level that is approximately 7.8 dB lower than the amplitude of the component at 100 kHz is designated as "Threshold" and the amplitude level that is approximately 10.8 dB lower than the amplitude of the component at 100 kHz is designated as "Safe". In order to represent the amplitude of a complex waveform with a single level, the convention shown in FIG. 17a is used. Specifically, the amplitude level indicated by the horizontal line labeled "Safe" or "Threshold" in FIG. 17 is to be compared to horizontal line 300 that extends through the waveform. Thus, using filter/ignitor 210 without a bridge frequency sweep would not sufficiently reduce the amplitude of the extra components. While an even higher order filter circuit could be designed to provide the needed attenuation, it would be an unnecessary expense. Furthermore, as the filter/ignitor circuit becomes more complex, it becomes difficult to maintain the desirable features of the original filter/ignitor 86 regarding the accurate reproduction of the desired power spectrum components (as shown in FIG. 2b).

Thus, in accordance with the present invention, a bridge frequency sweep is used in combination with filter/ignitor circuit 210.

It is to be understood that other bridge frequency sweep and filter/ignitor circuitry configurations can be used to achieve the desired results. It is preferable that the bridge frequency sweep and filter/ignitor circuitry configurations that are utilized accurately reproduce the desired power frequency components (those components below 150 kHz in FIG. 17) and maintain the components of the power frequencies above about 150 kHz at least 7.8 dB below the amplitude of the component at 150 kHz. It is most preferable that the bridge frequency sweep and filter/ignitor circuitry configurations accurately reproduce the desired power frequency components (those components below 150 kHz in FIG. 17) and maintain the components of the power frequencies above about 150 kHz at least 10.8 dB below the amplitude of the component at 150 kHz. For example, the combination of filter/ignitor 86 and a bridge frequency sweep of 350 kHz to 450 kHz in 5 ms (milli-seconds) followed by 450 kHz to 350 kHz in 5 mS coincident with the FM sweep of 45 kHz to 55 kHz in 10 ms produces the desired attenuation. If filter/ignitor circuit 210 is used, then the sweep width and bridge frequency can be decreased. For example, the combination of filter/ignitor 210 and a bridge frequency sweep of 250 kHz to 325 kHz in 5 mS followed by 325 kHz to 250 kHz in 5 ms coincident with the 10 ms FM sweep produces the desired attenuation.

In the examples described in the foregoing description, the sweeps are linear in time. However, wide, linear bridge frequency sweeps produce extra components that, while reduced in amplitude, are not flat-topped but rather, have a "tilted top". An example of a preferred flat-topped component is illustrated by the component shown in FIG. 17a. The component shown in FIG. 17a is modulated but on the average has a substantially flat top. Wide, linear bridge frequency sweeps cause the extra components to develop the aforesaid tilted top. The tilted top develops because in the voltage spectrum, the swept term at the bridge frequency is less attenuated at the low end of the frequency range than at the high end of the frequency range. This is a property of either filter/ignitor 86 or 210. In order to substantially remove or eliminate the tilted tops, the nonlinear bridge frequency sweep of FIG. 18a is used in combination with filter/ignitor circuit 210. The non-linear bridge frequency sweep shown in FIG. 18a, when used in combination with filter/ignitor circuit 210, substantially flattens the peaks or top portions of the extra power spectrum components. The non-linear bridge frequency sweep shown in FIG. 18a is used in place of a sweep that proceeds linearly from 250 kHz to 325 kHz in 5 ms, then proceeds linearly from 325 kHz to 250 kHz in 5 ms. The nonlinear sweep shown in FIG, 18a has a higher sweep rate (Hz/s) at lower frequencies than at higher frequencies. Thus, the sweep spends relatively less time at lower frequencies than at the higher frequencies. As a result, the power spectrum at the lower frequencies is of relatively lower amplitude than the amplitude of the power spectrum at the higher frequencies. This compensates for the fact that filter/ignitor circuit 210 causes the amplitude of the power spectrum to be relatively higher at the lower frequencies. Thus, the combination of the optimum bridge frequency sweep and filter/ignitor circuit 210 cancels the opposite effects upon the amplitude of the lower frequencies, as described above, and provides a substantially flat top.

Figure 18:
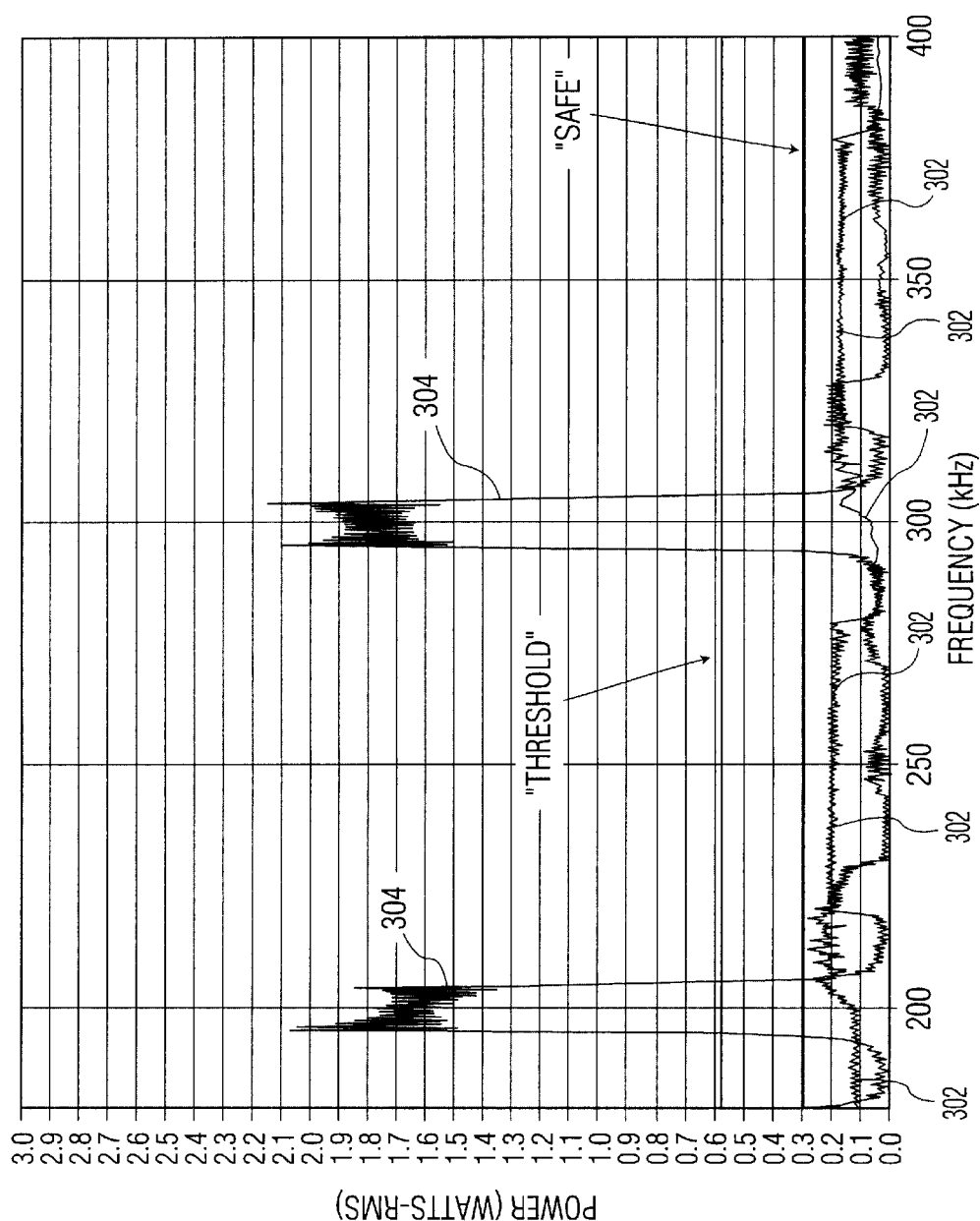
FIG. 18 illustrates the lamp power spectrum resulting from the ballast system of FIG. 14 when the bridge circuit frequency was swept within a range defined by 287.5 kHz +/−37.5 kHz and the filter/ignitor circuit shown in FIG. 14 was utilized.
Figure 18A:
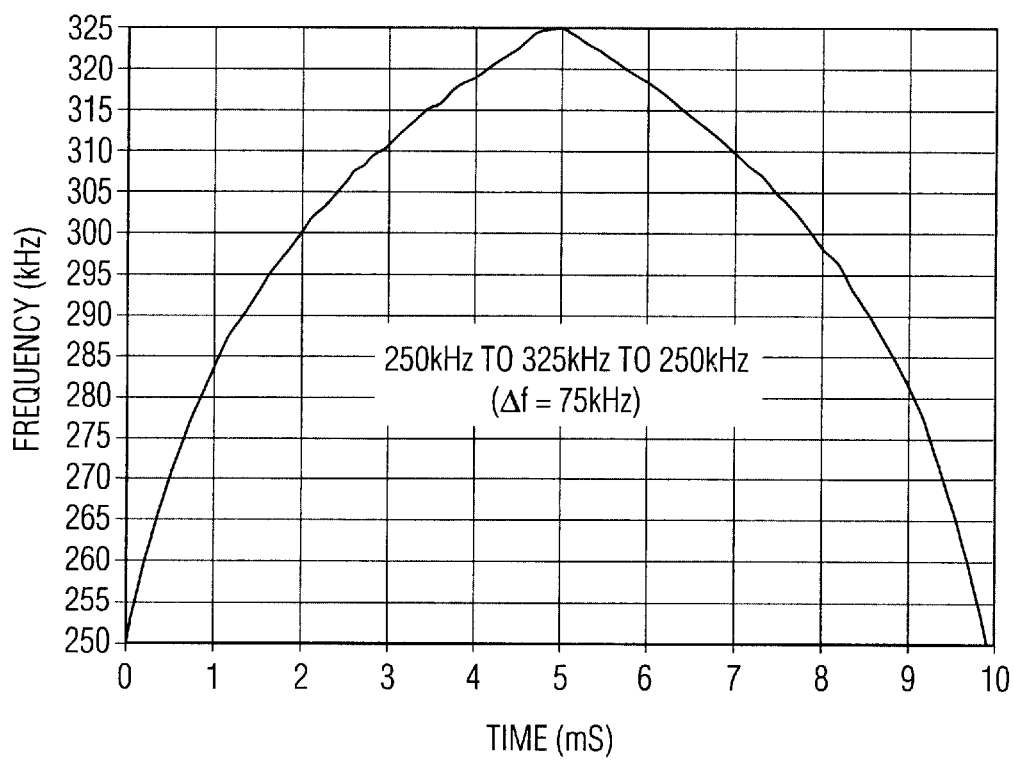
FIG. 18A is one embodiment of a bridge frequency sweep that is used to substantially flatten the response of extra power spectral components.

FIG. 18 shows the load power spectrum data 302 that was obtained with the aforementioned nonlinear sweep and filter/ignitor 210. No portion of the power spectrum data 302 exceeds the "Safe" level. Load power spectrum data 302 was measured for the following conditions:

a) ballast system 200 was used;
b) pre-conditioner 206 was configured as a DC power supply;
c) filter/ignitor 210 used the component values previously specified;
d) PWM module 232 was specially designed to have a bridge frequency sweep capability;
e) control signals 230 and 234 were generated by function generators;
f) control signal 230 comprises the FM sweep of 55 kHz to 45 kHz in 10 ms;
g) control signal 234 is coincident with the FM sweep and effects the bridge frequency sweep shown in FIG. 18a;
h) a 550 ohm resistor was used as a load to represent the lamp;
(i) a bus voltage $V_{bus}$ of 528 volts was used to produce a total power dissipation of 75 W at the load;
(j) the "Threshold" and "Safe" levels are to be interpreted as previously explained in connection with FIG. 17a;
k) the spectrum has been averaged over a 1 kHz window in order to smooth the spectrum and facilitate viewing of the spectrum; and
l) the resulting power amplitude is below the "Safe" level.

As shown in FIG. 18, a predetermined power "Threshold" for power spectral components over 150 kHz is chosen to be about 0.575 watts. The "Safe" power level is chosen to be half the "threshold" power level. Therefore, "safe" power level can used as design criteria for designing ballast system 200.

For purposes of comparison, FIG. 18 also shows load power spectrum data 304 which relates to the combination of filter ignitor 86 with a fixed bridge frequency of 250 kHz. Contrary to power spectrum data 302, load power spectrum data 304 not only exceeds the "Safe" level, but also significantly exceeds the "Threshold" level.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the invention. Accordingly, the foregoing detailed description should be considered exemplary in nature and not limited to the scope and spirit of the invention as set forth in the attached claims.

What is claimed is:

1. A ballast system for driving a gas discharge lamp comprising:

a bridge circuit for generating a pulse voltage signal, the bridge circuit having an operational frequency for producing pulses of said pulse voltage signal at a rate based on said operational frequency, a power input for receiving power from a power source, and a control signal input for receiving a control signal that effects sweeping of the operational frequency and generation of the pulse voltage signal;

a controller for controlling the bridge circuit, the controller comprising circuitry for (i) generating a first signal that has a desired waveform comprising a frequency swept signal that is amplitude modulated by a fixed frequency signal, the signal generated by the controller being inputted into the control signal input of the bridge circuit, and (ii) periodically sweeping the operational frequency of the bridge circuit; and a filter circuit for filtering the pulse voltage signal to suppress frequencies based on the swept operational frequency and output a signal corresponding to the desired waveform.

2. The ballast system according to claim 1 wherein the circuitry of the controller comprises a signal generator that generates the first signal and a signal defining a sweep waveform.

3. The ballast system according to claim 2 wherein the signal generator comprises an AM/FM signal generator for generating said first signal.

4. The ballast system according to claim 2 wherein the circuitry of the controller is configured to effect a non-linear sweep of the operational frequency of the bridge circuit.

5. The ballast system according to claim 2 wherein the circuitry of the controller is configured to effect a linear sweep of the operational frequency of the bridge circuit.

6. The ballast system according to claim 1 wherein the filter circuit comprises a low pass filter.

7. The ballast system according to claim 1 wherein the filter is configured to reproduce the desired power frequency components below about 150 kHz and maintain the components of the power frequencies above about 150 kHz at least 7.8 dB below the amplitude of the component at 150 kHz.

8. The ballast system according to claim 1 wherein the filter is configured to reproduce the desired power frequency components below about 150 kHz and maintain the components of the power frequencies above about 150 kHz at least 10.8 dB below the amplitude of the component at 150 kHz.

9. The ballast system according to claim 1 wherein the ballast bridge unit includes a pair of AC output ports, one of the output ports being configured to be coupled to an input of a discharge lamp, and the filter comprises:

a "T" network comprising having an input and a pair of outputs, the "T" network comprising a first inductive energy source having an input that defines the input of the "T" network and an output, a first capacitive energy source having an input coupled to the output of the first inductive energy source and an output coupled to said one of the output ports of the bridge circuit, a second inductive energy source having an input coupled to the output of the first inductive energy source and an output configured to be coupled to another input of the discharge lamp; and a second capacitive energy source in series with the first inductive source and having an input coupled to the other output port of the bridge circuit.

10. A method of driving a gas discharge lamp, comprising the steps of:

providing a ballast system having a bridge circuit for generating a pulse voltage signal, the bridge circuit having an operational frequency for producing pulses of said pulse voltage signal at a rate based on said operational frequency, a power input for connection to a power source, and a control signal input for receiving a signal that effects sweeping of the operational frequency and generation of the pulse voltage signal;

generating a signal that has a desired waveform comprising a frequency swept signal that is amplitude modulated by a fixed frequency signal, and inputting the generated signal into the control signal input of the bridge circuit;

periodically sweeping the operational frequency of the bridge circuit; and filtering the pulse voltage signal generated by the bridge circuit to suppress frequencies based on the swept operational frequency and output a signal corresponding to the desired waveform.

11. The method according to claim 10 wherein the sweep of the operational frequency of the bridge circuit is a non-linear sweep.

12. The method according to claim 10 wherein the sweep of the operational frequency of the bridge circuit is a linear sweep.

13. The method according to claim 10 wherein the filtering step comprises the steps of reproducing the desired power frequency components below about 150 kHz and maintaining the components of the power frequencies above about 150 kHz at least 7.8 dB below the amplitude of the component at 150 kHz.

14. The method according to claim 10 wherein the filtering step comprises the steps of reproducing the desired power frequency components below about 150 kHz and maintaining the components of the power frequencies above about 150 kHz at least 10.8 dB below the amplitude of the component at 150 kHz.

15. The method according to claim 10, comprising pulse width modulating the frequency swept, amplitude modulated signal at the operational frequency of the bridge, prior to inputting into the control signal input.

16. The ballast system according to claim 1, wherein the controller further comprises a pulse width modulating module receiving said first signal, for pulse width modulating the first signal at the operational frequency of the bridge circuit.

17. The ballast system according to claim 1, wherein the filter circuit is a low pass filter comprising first and second inductors connected in series between an output port of the bridge circuit and a first input of the lamp, and a capacitor connected between a node between said inductors and a second input of the lamp.

18. The ballast system according to claim 17, wherein the operational frequency is swept from a lowest operational frequency to a highest operational frequency and back to the lowest operational frequency coincidentally with the swept frequency of the first signal.

19. The ballast system according to claim 18, wherein the operational frequency of the bridge is swept between approximately 250 kHz and 325 kHz.

20. The ballast system according to claim 19, wherein the first signal is swept between approximately 45 kHz and 55 kHz in a period of 10 ms.

* * * * *